(12) United States Patent
Seo et al.

(10) Patent No.: US 8,787,408 B2
(45) Date of Patent: Jul. 22, 2014

(54) METHOD AND APPARATUS FOR TRANSMITTING ADDITIONAL DATA IN DIGITAL TERRESTRIAL BROADCASTING SYSTEM

(75) Inventors: Jae Hyun Seo, Daejeon-si (KR); Joung Il Yun, Daejeon-si (KR); Heung Mook Kim, Daejeon-si (KR); Soo In Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 174 days.

(21) Appl. No.: 13/242,685

(22) Filed: Sep. 23, 2011

(65) Prior Publication Data

US 2012/0076215 A1 Mar. 29, 2012

(30) Foreign Application Priority Data

Sep. 28, 2010 (KR) .......................... 10-2010-0093788
Feb. 22, 2011 (KR) .......................... 10-2011-0015491

(51) Int. Cl.
*H04J 3/12* (2006.01)

(52) U.S. Cl.
USPC .......................................................... 370/528

(58) Field of Classification Search
None
See application file for complete search history.

(56) References Cited

U.S. PATENT DOCUMENTS

| | | | |
|---|---|---|---|
| 2006/0120378 A1* | 6/2006 | Usuki et al. ............... | 370/395.4 |
| 2010/0040019 A1* | 2/2010 | Tinnakornsrisuphap et al. ........................ | 370/331 |
| 2010/0100920 A1* | 4/2010 | Baek et al. ................ | 725/116 |
| 2010/0265865 A9* | 10/2010 | Vijayan et al. ............ | 370/312 |
| 2011/0075710 A1* | 3/2011 | Park et al. ................. | 375/146 |
| 2011/0228865 A1* | 9/2011 | Park et al. ................. | 375/259 |

* cited by examiner

*Primary Examiner* — Chi Pham
*Assistant Examiner* — Raul Rivas
(74) *Attorney, Agent, or Firm* — Staas & Halsey LLP

(57) ABSTRACT

A method and an apparatus for transmitting additional data in a digital terrestrial broadcasting system are provided. The apparatus includes: a main signal generating unit channel-coding main data and converting the main data into a main signal; an additional signal generating unit channel-coding additional data and converting the additional data into an additional signal; a mixed signal generating unit generating a mixed signal by coupling the main signal and the additional signal to each other; and a mixed signal transmitting unit modulating the mixed signal and transmitting the modulated mixed signal to a receiver through a transmission antenna, wherein the additional data is additional data requested by a specific user possessing the receiver and the specific user provides information on an additional data transmitter.

8 Claims, 6 Drawing Sheets

METHOD AND APPARATUS FOR TRANSMITTING ADDITIONAL DATA IN DIGITAL TERRESTRIAL BROADCASTING SYSTEM

CROSS-REFERENCE TO RELATED APPLICATIONS

This application claims the benefit of priority of Korean Patent application No. 10-2010-0093788 filed on Sep. 28, 2010, and Korean Patent application No. 10-2011-0015491 filed on Feb. 22, 2011, all of which are incorporated by reference in their entirety herein.

BACKGROUND OF THE INVENTION

1. Field of the Invention

The present invention relates to a digital terrestrial broadcasting, and more particularly, to a method and an apparatus for transmitting additional data in a digital terrestrial broadcasting system.

2. Related Art

In accordance with the development of a digital broadcasting service, there is a need to additionally transmit various data as well as simply transmitting video and audio. That is, in order to additionally provide a supplementary service in addition to a basic service, additional data may be defined and transmitted. As application services utilizing the additional data, a three-dimensional (3D) video service in which a left video is defined as a basic service and a right video or depth data is defined as a supplementary service, an ultra high definition (UHD) service in which high definition (HD) video quality is defined as a basic service and a UHD video quality is defined as a supplementary service, a data service connected with a video service, an electronic program guide (EPG), and the like, may be provided. In additionally providing the supplementary service, it is necessary to have backward compatibility with the terrestrial broadcasting system according to the related art. That is, a new terrestrial broadcasting system providing the supplementary service and the terrestrial broadcasting system according to the related art needs to be compatible with each other.

Meanwhile, in the case of the digital broadcasting system according to the related art, broadcasting stations unilaterally broadcast broadcasting programs to all users, and a user views a desired broadcasting program among the broadcasting programs broadcasted by the broadcasting stations by selecting a desired channel. In addition, a digital cable broadcasting system provides a return channel. The broadcasting station may provide a broadcasting program, data, or the like, requested by a specific user to the specific user through the return channel. However, since a digital terrestrial broadcasting system does not have the return channel, it is difficult to provide a broadcasting program, data, or the like, requested by a specific user to the specific user. Therefore, a current digital terrestrial broadcasting system has used a separate communication network, Internet network, or the like, as a return channel.

In the case of transmitting additional data while having backward compatibility with the digital broadcasting system according to the related art, at least two transmitters transmit the same present broadcasting program and the same additional data. When a specific user requests a broadcasting station server for additional data through a separate communication network, Internet network, or the like, and a plurality of transmitters transmit the additional data, the same present broadcasting program and the same additional data are included even in broadcasting signals corresponding to different broadcasting areas. That is, even a transmitter within a broadcasting area in which the specific user is not included transmits the same additional data, such that efficiency is deteriorated.

Therefore, a need exists for a method for efficiently transmitting additional data requested by a user.

SUMMARY OF THE INVENTION

The present invention provides a method and an apparatus for transmitting additional data in a digital terrestrial broadcasting system.

In an aspect, an apparatus for transmitting additional data in a digital terrestrial broadcasting system is provided. The apparatus includes a main signal generating unit configured for performing channel-coding main data and converting the main data into a main signal, an additional signal generating unit configured for performing channel-coding additional data and converting the additional data into an additional signal, a mixed signal generating unit configured for generating a mixed signal by combining the main signal and the additional signal, and a mixed signal transmitting unit configured for modulating the mixed signal and transmitting the modulated mixed signal to a receiver through a transmission antenna, wherein information on a transmitter of the apparatus for transmitting additional data is additionally transmitted.

The information on a transmitter may be an identification number of the apparatus for transmitting additional data.

The additional data may be additional data requested by the receiver.

A unique number of the receiver and an identification number of a transmitter transmitting broadcasting to a broadcasting area including a place at which the receiver is positioned may be transmitted by the receiver together with the request of the additional data.

The information on a transmitter transmitted by the apparatus for transmitting additional data and the identification number of the transmitter transmitted by the receiver may coincide with each other.

The additional data may be independently transmitted according to the information on a transmitter transmitted by the apparatus for transmitting additional data.

In another aspect, an apparatus for receiving additional data in a digital terrestrial broadcasting system is provided. The apparatus includes a mixed signal receiving unit configured for receiving and demodulating a mixed signal through a reception antenna, a main signal restoring unit configured for performing channel-decoding a main signal within the demodulated mixed signal, a main data extracting unit configured for extracting main data from the channel-decoded main signal, an additional signal restoring unit configured for restoring an additional signal by removing the main signal from the demodulated mixed signal, and an additional data extracting unit configured for extracting additional data by performing channel-decoding the restored additional signal.

In another aspect, a method for transmitting additional data in a digital terrestrial broadcasting system is provided. The method includes generating a main signal and an additional signal from main data and additional data respectively, generating a mixed signal by combining the main signal and the additional signal, transmitting the generated mixed signal to a receiver through an antenna, and transmitting information on a transmitter of an apparatus for transmitting additional data.

The information on a transmitter may be an identification number of the apparatus for transmitting additional data.

The additional data may be additional data requested by the receiver.

The receiver may transmit a unique number of the receiver and an identification number of a transmitter transmitting broadcasting to a broadcasting area including a place at which the receiver is positioned, together with the request of the additional data.

The information on a transmitter transmitted by the apparatus for transmitting additional data and the identification number of the transmitter transmitted by the receiver may coincide with each other.

The additional data may be independently transmitted according to the information on a transmitter transmitted by the apparatus for transmitting additional data.

In another aspect, a method for receiving additional data in a digital terrestrial broadcasting system is provided. The method includes receiving a mixed signal, restoring a main signal and an additional signal from the received mixed signal, and extracting main data and additional data respectively from the main signal and the additional signal.

DESCRIPTION OF EXEMPLARY EMBODIMENTS

Figure 1:
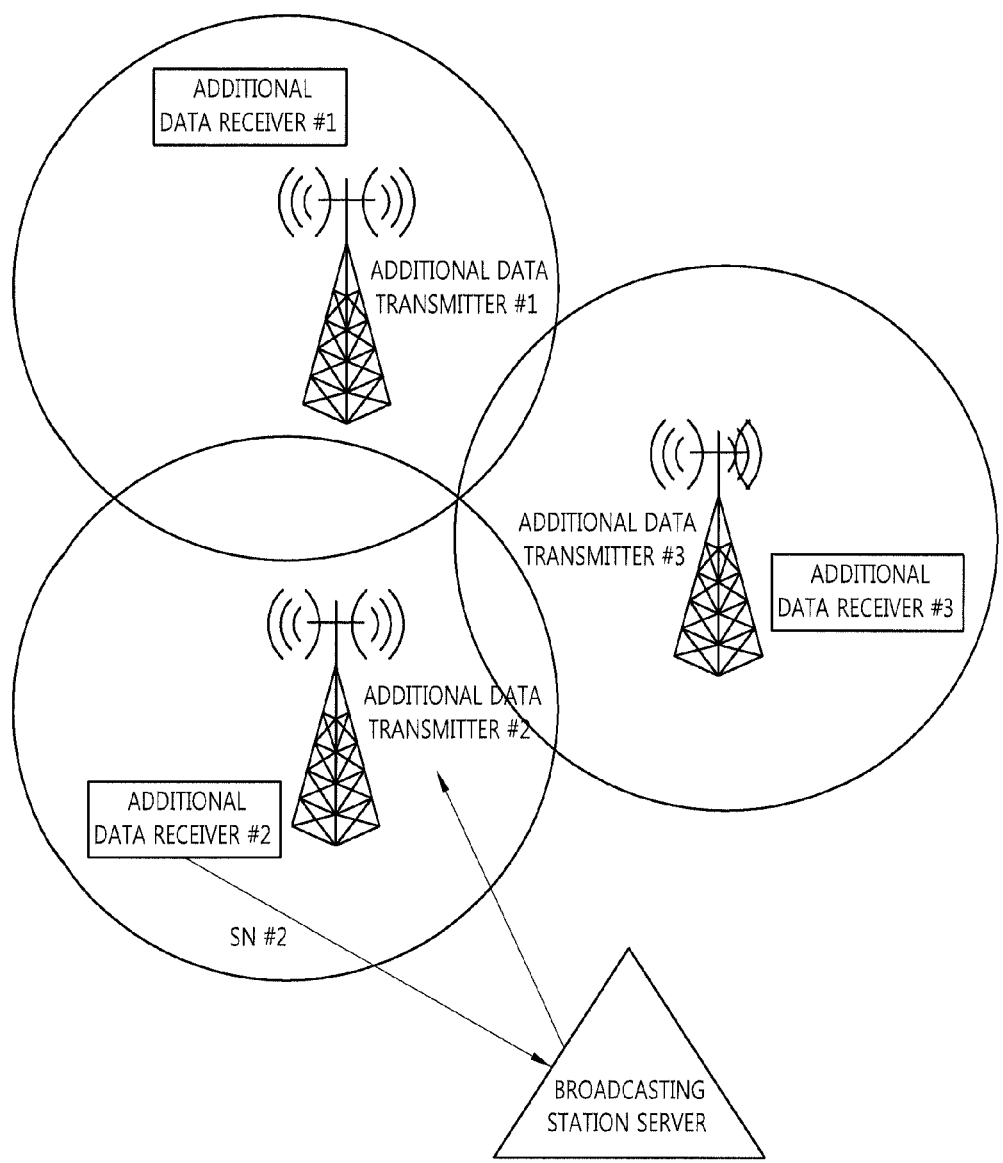
FIG. 1 is a diagram showing an example of a configuration in which additional data requested by a user is transceived in the digital broadcasting system according to the related art.

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

FIG. 1 is a diagram showing an example of a configuration in which additional data requested by a user is transceived in the digital broadcasting system according to the related art.

Referring to FIG. 1, in the digital broadcasting system according to the related art, each of additional data transmitters #1, #2, and #3 transmits a broadcasting program to a broadcasting area assigned thereto. All of the additional data transmitters #1, #2, and #3 may transmit the same present broadcasting program among broadcasting programs. However, additional data may be independently transmitted by each additional data transmitter. That is, the additional data transmitter #1 may independently transmit additional data to a first broadcasting area, the additional data transmitter #2 may independently transmit additional data to a second broadcasting area, and the additional data transmitter #3 may independently transmit additional data to a third broadcasting area.

It is assumed that a user possessing an additional data receiver #2 positioned in the second broadcasting area assigned to the additional data transmitter #2 requests a broadcasting station server for additional data such as his/her desired broadcasting program, data, or the like. The additional data receiver #2 may request the broadcasting station server for the additional data while transmitting a unique number SN #2 thereof. Here, the broadcasting station server may not know an assigned area in which the user is positioned. That is, the broadcasting station server may not know a broadcasting area of an additional data transmitter to which the user belongs. Therefore, all of the additional data transmitters #1, #2, and #3 needs to transmit the same present broadcasting program and the same additional data in order transmit the additional data desired by the user possessing the additional data receiver having the unique number (SN) #2 to him/her. As a result, the same additional data is transmitted to the first and third broadcasting areas as well as the second broadcasting area assigned to the additional data transmitter #2, such that efficiency of the transmission is deteriorated.

Figure 2:
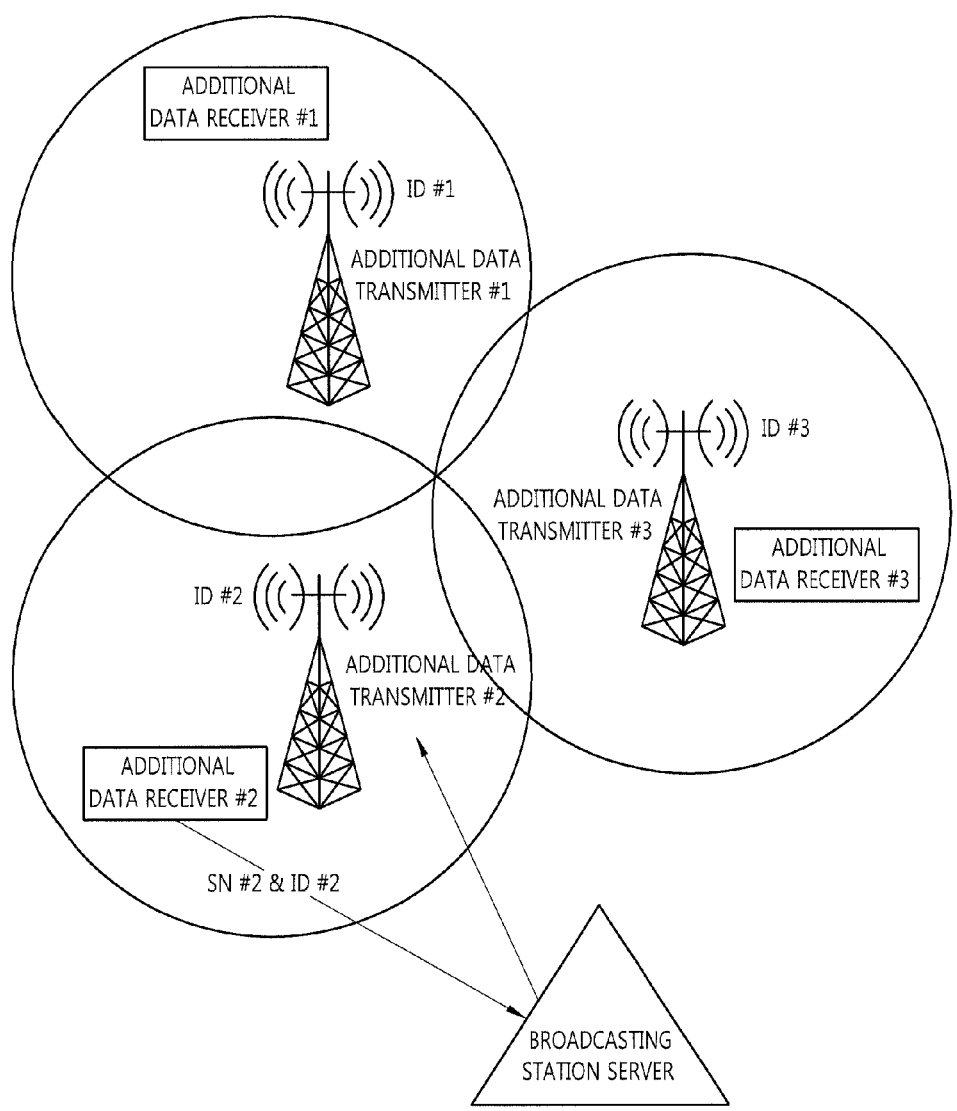
FIG. 2 is a diagram showing an example of a configuration in which additional data requested by a user is transceived according to a method for transmitting additional data suggested in the present invention.

FIG. 2 is a diagram showing an example of a configuration in which additional data requested by a user is transceived according to a method for transmitting additional data suggested in the present invention.

Referring to FIG. 2, each of additional data transmitters #1, #2, and #3 transmits a broadcasting program to first to third broadcasting areas, which are broadcasting areas assigned thereto. Here, each of the additional data transmitters may transmit ID #1, #2, and #3, which is identification numbers thereof. Therefore, the present broadcasting programs transmitted by each of the additional data transmitters are the same as each other. However, additional data distinguished from each other by ID #1, #2, and #3, which are identification numbers of the additional data transmitters, may be transmitted independently by each of the additional data transmitters. The identification number of the transmitter is information through which a broadcast area to which a user of the additional data receiver belongs may be known. The additional data is transmitted using the identification number, such that it may be efficiently transmitted.

It is assumed that a user possessing an additional data receiver #2 positioned in a second broadcasting area assigned to the additional data transmitter #2 requests a broadcasting station server for additional data. The additional data receiver #2 may request the broadcasting station server for the additional data while transmitting an identification number ID #2 of the transmitter together with a unique number SN #2 of the receiver. The broadcasting station server receives the additional data requested by the additional data receiver and the identification number ID #2 of the transmitter and transfers the additional data requested by the user to the additional data transmitter #2 having the identification number. The additional data transmitter #2 may transmit the additional data requested by the user possessing the additional data receiver having the unique number SN #2 to him/her. Therefore, the additional data transmitter #1 having the identification number ID #1 and the additional data transmitter #3 having the identification number ID #3 need not to transmit the additional data requested by the user. The additional data is transmitted based on the identification number, thereby making it possible to increase efficiency of the transmission of the additional data. That is, the efficiency for the transmission of the additional data may be increased by the number of additional data transmitters connected to the broadcasting station server.

The method of distinguishing each additional data transmitter from each other as described above may be applied, regardless of whether or not channels are the same as each other. In addition, although the present invention has suggested a method of using the identification number imparted to each additional data transmitter as the method of distinguishing each additional data transmitter from each other, it is not limited thereto. The present invention may be similarly applied to a method of distinguishing each additional data transmitter from each other through a method that is not mentioned in the present specification and transmitting the additional data based on the distinguished additional data transmitters.

Figure 3:
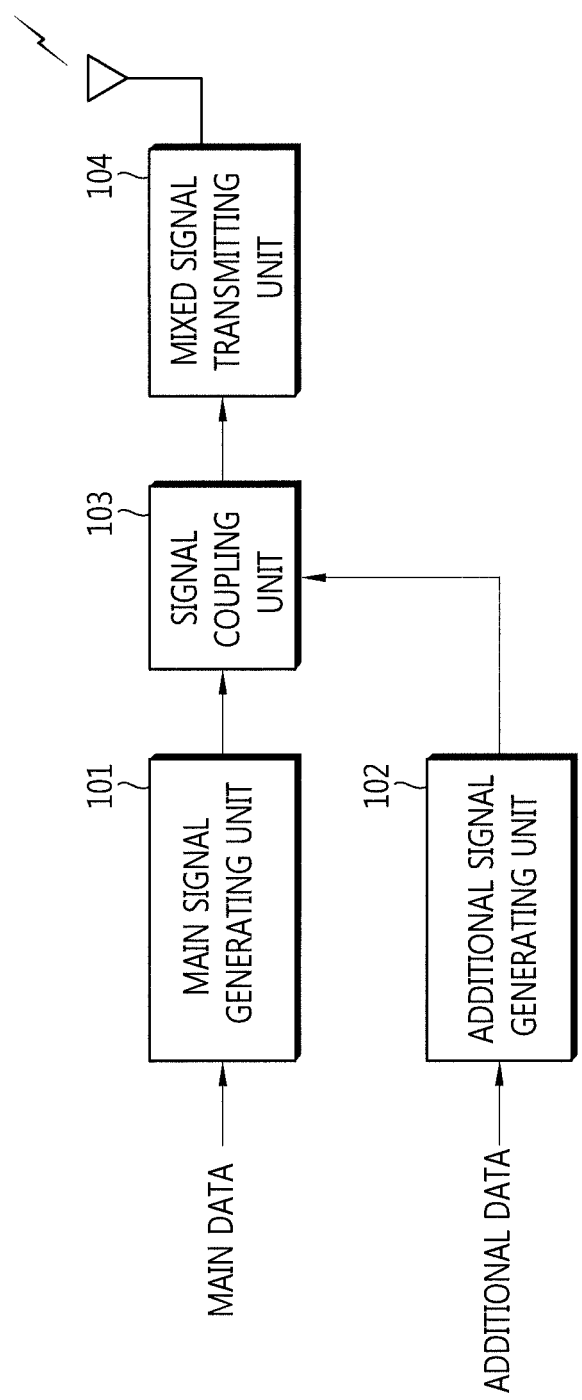
FIG. 3 is a diagram showing an example of a configuration an additional data transmitter implementing a method for transmitting additional data suggested in the present invention.

FIG. 3 is a diagram showing an example of a configuration an additional data transmitter implementing a method for transmitting additional data suggested in the present invention. The additional data transmitter shown in FIG. 3 is an apparatus for transmitting both of the present broadcasting program and additional data while maintaining backward compatibility with the digital broadcasting system according to the related art.

A main signal generating unit 101 channel-codes main data such as a MPEG-2 transport stream (TS) type of video, audio, data, or the like and converts the channel-coded main data into a digital main signal. An additional signal generating unit 102 channel-codes additional data and converts the channel-coded additional data into an additional signal, separately from the main signal generating unit 101. Here, the additional data may include an identification number of a transmitter and a specific number of an additional data receiver in addition to additional data requested by a user. The signal coupling unit 103 generates a mixed signal by coupling the main signal and the additional signal to each other. Here, the generated mixed signal may be have a power that is sufficiently lower than that of the digital main signal. The mixed signal is modulated according to a broadcasting specification in a mixed signal transmitting unit 104 and is finally transmitted through a transmission antenna. The additional signal is transmitted at a power that is sufficiently lower than that of the digital main signal, thereby making it possible to have backward compatibility with the broadcasting signal of the digital broadcasting system according to the related art.

Figure 4:
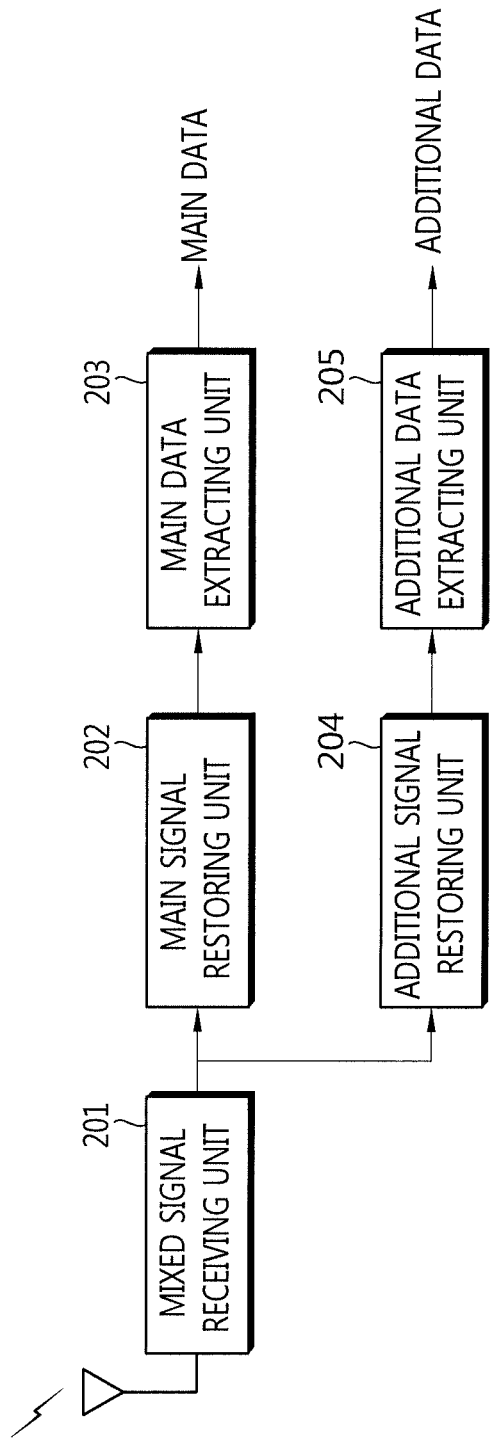
FIG. 4 is a diagram showing an example of a configuration an additional data receiver implementing a method for transmitting additional data suggested in the present invention.

FIG. 4 is a diagram showing an example of a configuration an additional data receiver implementing a method for transmitting additional data suggested in the present invention. The additional data receiver shown in FIG. 4 is an apparatus for receiving both of the present broadcasting program and additional data while maintaining backward compatibility with the digital broadcasting system according to the related art.

A mixed signal receiving unit 201 receives and demodulates a mixed signal through a reception antenna. A main signal restoring unit 202 channel-decodes a main signal from the demodulated mixed signal, and a main data extracting unit 203 extracts main data from the channel-decoded main signal. An additional signal restoring unit 204 restores an additional signal by removing the main signal from the demodulated mixed signal, and an additional data extracting unit 205 extracts additional data by channel-decoding the restored additional signal.

Figure 5:
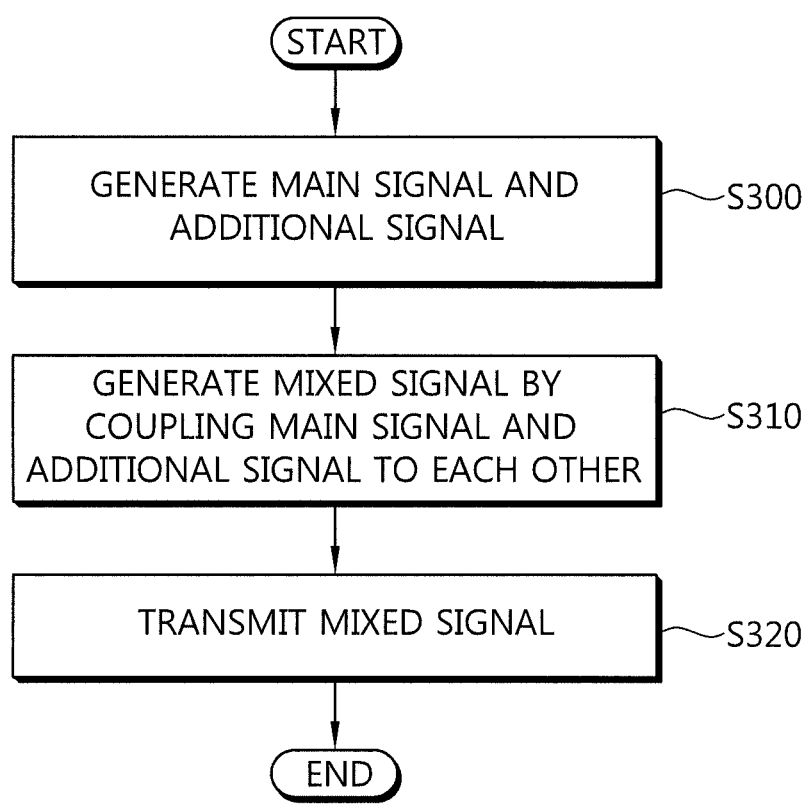
FIG. 5 is a diagram showing an example of a method for transmitting additional data suggested in the present invention.

FIG. 5 is a diagram showing an example of a method for transmitting additional data suggested in the present invention. In operation (S400), an additional data transmitter generates a main signal and an additional signal from each of main data and additional data. In operation (S410), an additional data transmitter generates a mixed signal by coupling the main signal and the additional signal to each other. In operation (S420), the additional data transmitter transmits the generated mixed signal through an antenna.

Figure 6:
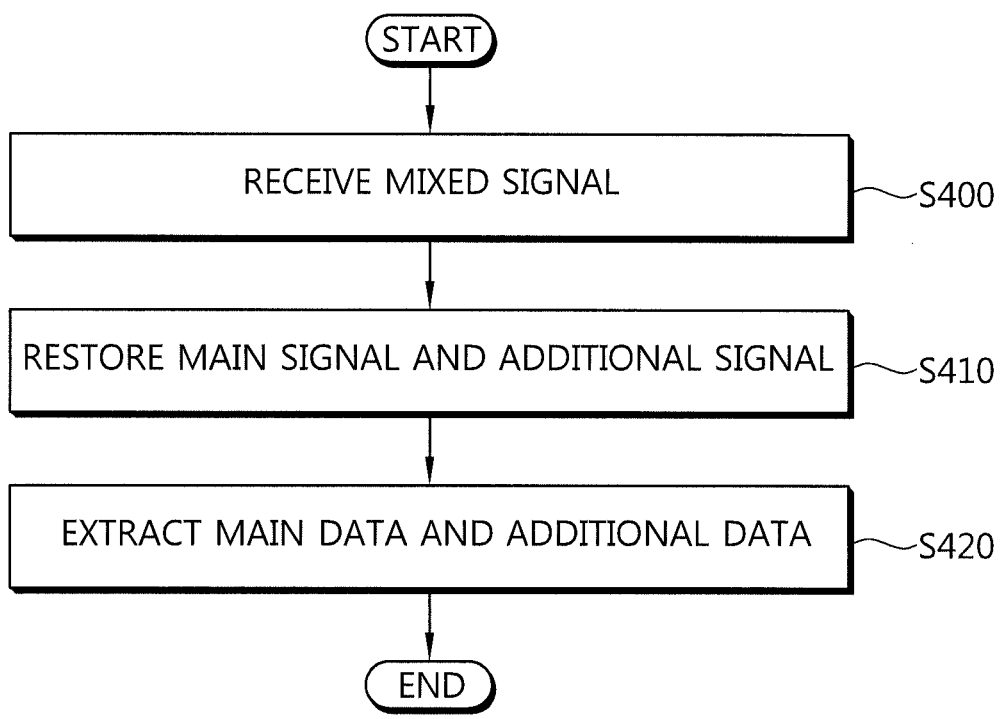
FIG. 6 is a diagram showing an example of a method for receiving additional data suggested in the present invention.

FIG. 6 is a diagram showing an example of a method for receiving additional data suggested in the present invention. In operation (S500), an additional data receiver receives a mixed signal. In operation (S510), the additional data receiver restores a main signal and an additional signal from the received mixed signal. In operation (S520), the additional data receiver extracts main data and additional data from each of the main signal and the additional signal.

According to the present invention, in the digital broadcasting system, the same present broadcasting systems are transmitted by all of transmitters. However, the additional data may be independently transmitted by each of the transmitters. When additional data desired by a specific user is requested by him/her, information on the transmitter transmitting the broadcasting signal that is received by the receiver is transmitted together with information on the receiver, thereby making it possible to allow only a transmitter within a broadcasting area to which the specific user belongs to transmit the additional data requested by the user to him/her. Therefore, it is possible to efficiently transmit and receive the additional data. In the digital broadcasting system utilizing the present invention, all of the transmitters transmit the present broadcasting program, thereby making it possible to provide a common and universal service. In addition, each of the transmitters independently transmits the additional data, thereby making it possible to more rapidly and efficiently transmit the additional data in response to the request by the user in a limited broadcasting frequency band. Further, since the additional data may be transmitted to a limited broadcasting area, there is an advantage in terms of security.

The present invention may be implemented by hardware, software, or a combination thereof. The hardware may be implemented as an application specific integrated circuit (ASIC), digital signal processing (DSP), a programmable logic device (PLD), a field programmable gate array (FPGA), a processor, a controller, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

A broadcasting area of what broadcasting area a user belongs to is determined based on the information on the transmitter transmitted together with the additional data at the time of request of the additional data by the user, thereby making it possible to efficiently transmit and receive the additional data.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. An apparatus for transmitting additional data in a digital terrestrial broadcasting system, the apparatus comprising:
    a main signal generating unit configured for performing channel-coding main data and converting the main data into a main signal;
    an additional signal generating unit configured for performing channel-coding additional data and converting the additional data into an additional signal;
    a mixed signal generating unit configured for generating a mixed signal by combining the main signal and the additional signal; and
    a mixed signal transmitting unit configured for modulating the mixed signal and transmitting the modulated mixed signal to a receiver through a transmission antenna,
    wherein information on a transmitter of the apparatus for transmitting additional data is additionally transmitted,
    wherein the additional data is additional data requested by the receiver, and
    wherein a unique number of the receiver and an identification number of a transmitter transmitting broadcasting to a broadcasting area including a place at which the receiver is positioned are transmitted by the receiver together with the request for the additional data.

2. The apparatus of claim 1, wherein the information on a transmitter is an identification number of the apparatus for transmitting additional data.

3. The apparatus of claim 1, wherein the information on a transmitter transmitted by the apparatus for transmitting additional data and the identification number of the transmitter transmitted by the receiver coincide with each other.

4. The apparatus of claim 1, wherein the additional data is independently transmitted according to the information on a transmitter transmitted by the apparatus for transmitting additional data.

5. A method for transmitting additional data in a digital terrestrial broadcasting system, the method comprising:
    generating a main signal and an additional signal from main data and additional data respectively;
    generating a mixed signal by combining the main signal and the additional signal;
    transmitting the generated mixed signal to a receiver through an antenna; and
    transmitting information on a transmitter of an apparatus for transmitting additional data,
    wherein the additional data is additional data requested by the receiver, and
    wherein the receiver transmits a unique number of the receiver and an identification number of a transmitter transmitting broadcasting to a broadcasting area including a place at which the receiver is positioned, together with the request for the additional data.

6. The method of claim 5, wherein the information on a transmitter is an identification number of the apparatus for transmitting additional data.

7. The method of claim 5, wherein the information on a transmitter transmitted by the apparatus for transmitting additional data and the identification number of the transmitter transmitted by the receiver coincide with each other.

8. The method of claim 5, wherein the additional data is independently transmitted according to the information on a transmitter transmitted by the apparatus for transmitting additional data.

* * * * *